July 26, 1960 S. V. WORTH ET AL 2,946,137
CHILD'S STORY BOOK WITH SHIFTABLE PICTURES
Filed Aug. 10, 1959

INVENTORS
SIDNEY V. WORTH
ROBERT C. REBLING
BY

ATTORNEY.

United States Patent Office 2,946,137
Patented July 26, 1960

2,946,137
CHILD'S STORY BOOK WITH SHIFTABLE PICTURES

Sidney V. Worth, 8041 Mansfield Ave., Philadelphia, Pa., and Robert C. Rebling, 2140 Curtis Ave., Abington, Pa.

Filed Aug. 10, 1959, Ser. No. 832,548

5 Claims. (Cl. 35—35)

The present invention relates to a book, and more particularly to a book designed to teach and amuse a child.

An accepted method for teaching children to read is to associate words with pictures illustrating the words. For this purpose it would be desirable to have a book which contains stories and separate pictures illustrating the stories, which pictures are arranged so that a child can pick out which picture illustrates a particular story. The arrangement of the pictures and stories must be such that the association of the pictures with the stories is not only instructive to a child, but is also amusing to the child so as to maintain the child's interest.

It is an object of the present invention to provide a novel book.

It is another object of the present invention to provide a novel book which is instructive and amusing to children.

It is a further object of the present invention to provide a book containing stories and separate pictures, which pictures can be removed from the book and associated with the stories.

It is still a further object of the present invention to provide a book having stories and removable pictures for association with the stories, which pictures can be replaced in the book for re-use.

Other objects will appear hereinafter.

For the purpose of illustrating the invention there is shown in the drawings forms which are presently preferred; it being understood, however, that this invention is not limited to the precise arrangements and instrumentalities shown.

Figure 1:
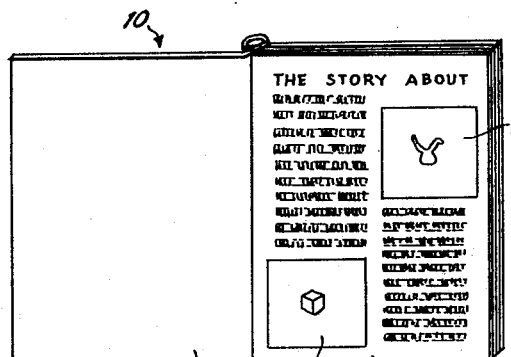
Figure 1 is a perspective view of the book of the present invention open to a page toward the front of the book.
Figure 2:
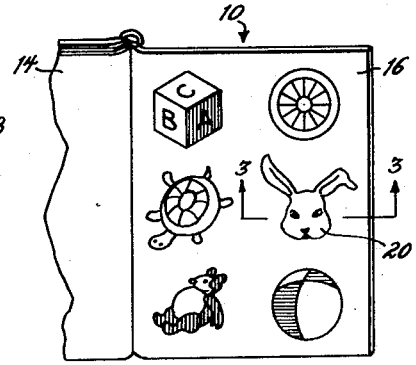
Figure 2 is a perspective view of a portion of the book of the present invention showing a page toward the back of the book.
Figure 5:
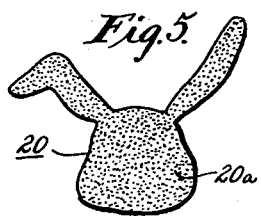
Figure 5 is a view taken along line 5—5 of Figure 4.

Referring initially to Figures 1 and 2, the book of the present invention is generally designated as 10.

Book 10 comprises a cover 12 having pages 14 and 16 bound therein. The pages 14 are at the front of the book 10, and are paper pages having printed matter in the form of stories thereon. Each of the pages 14 has one or more spaces 18 free of any printed matter. The spaces 18 provide areas where pictures illustrating the story or a word in the story may be placed. If desired, the spaces 18 may be provided with small pictures showing which of the cut-out pictures should be placed in the space 18.

Figure 3:
Figure 3 is a sectional view taken along line 3—3 of Figure 2.

The page or pages 16 are at the back of the book 10, and contain the cut-out pictures 20 which are to be placed in the spaces 18 of the pages 14. As shown in Figure 3, the page 16 comprises a paper backing sheet 22, a transparent plastic sheet 24 bonded to the paper backing sheet 22, and a cardboard sheet 26 secured to the plastic sheet 24. The carboard sheet 26 is die-cut to provide the various cut-out pictures 20. The cardboard sheet 26 is coated on its back surface with a pressure sensitive adhesive, by which the cardboard sheet 26 is secured to the plastic sheet 24.

Figure 4:
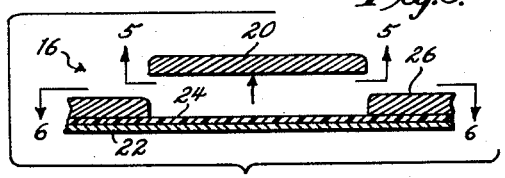
Figure 4 is a sectional view similar to that of Figure 3 with a cut-out picture removed from the book.
Figure 6:
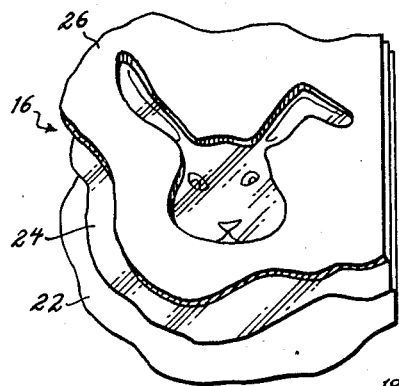
Figure 6 is a view taken along line 6—6 of Figure 4.

Since the cardboard sheet 26 is secured to the plastic sheet 24 by a pressure sensitive adhesive, the cut-out pictures 20 can be easily removed from the cardboard sheet 26 by peeling the cut-out picture 20 from the plastic sheet 24 as shown in Figure 4. When the cut-out pictures 20 are removed from the page 16, the back surface 20a of the cut-out picture 20 will retain a layer of the pressure-sensitive adhesive. The paper backing sheet 22 of the page 16 may be printed with pictures corresponding to the cut-out pictures 20. Thus, as shown in Figure 6, when the cut-out picture 20 is removed from the page 16, the picture printed on the paper backing sheet 22 is visible through the opening left in the cardboard sheet 26 and through the transparent plastic sheet 24.

In the use of the book 10 of the present invention, as the child reads the stories on the pages 14 of the book 10, the child can pick out the particular cut-out picture 20 on the page 16 which relates to the particular story or an emphasized word in the story. The child then removes the particular cut-out picture 20 from the page 16, and places the cut-out picture 20 in the space 18 on the page 14 which is associated with the story or the emphasized word in the story. When the child places the cut-out picture 20 on the space 18, the cut-out picture 20 will adhere to the page 14 by means of the pressure sensitive adhesive on the back surface of the cut-out picture 20. When the child has finished reading the book 10, and has placed all of the cut-out pictures 20 in the spaces 18, the book 10 can be checked by a teacher or parent to determine whether the child has correctly associated all of the pictures with the stories or emphasized words in the book 10. The child can then remove the cut-out pictures 20 from the spaces 18 of the pages 14, and place the cut-out pictures 20 back in the proper openings in the cardboard sheet 26 of the page 16.

Thus, the book 10 of the present invention teaches a child to read by associating pictures with stories or words in the book 10. In addition, the book 10 of the present invention amuses the child since the child must remove the cut-out pictures 20 from the page 16, and place them in the various spaces 18 of the pages 14. The book 10 of the present invention also amuses the child since the child upon completing the book 10 can replace the cut-out pictures 20 back in the openings in the cardboard sheet 26 of the page 16 which functions in the manner of a jig-saw puzzle. Thus, the book 10 of the present invention is both educational and amusing to a child. In addition, the book 10 can be reused by the same child or by different children.

Figures 7, 8:
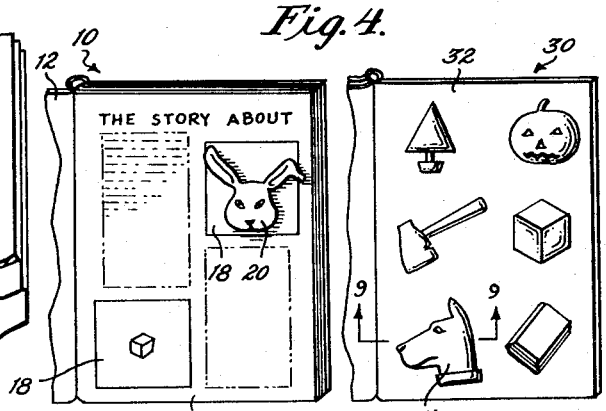
Figure 7 is a perspective view of a portion of the book of the present invention showing the manner of associating the cut-out pictures with the stories in the book.
Figure 8 is a perspective view of a back page of a modification of the book of the present invention.
Figure 10:
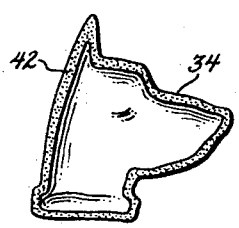
Figure 10 is a plan view of the back side of a cut-out picture from the modification of the book of the present invention shown in Figure 8.

Referring to Figure 8, a modification of the book of the present invention is generally designated as 30. Book 30 is identical to the book 10 shown in Figures 1 and 2 except as to the construction of the last page or pages 32 which contain the cut-out pictures 34.

Figure 9:
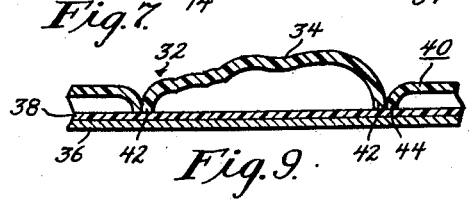
Figure 9 is a sectional view taken along line 9—9 of Figure 8.

Referring to Figure 9, the back page 32 comprises a paper backing sheet 36, a transparent plastic sheet 38, secured across the paper backing sheet 36, and a three-dimensional plastic sheet 40 secured across the transparent plastic sheet 38. The three-dimensional sheet 40 is molded to provide the cut-out pictures 34 in three-dimensional form. The edge 42 of each of the cut-out pictures 34 has a flat bottom surface which seats against the transparent plastic sheet 38. The edges 44 of the openings in the plastic sheet 40 around the cut-outs 34 also have a flat bottom surface which seats against the transparent plastic sheet 38. The bottom surfaces of the edges 42 and 44 of the cut-outs 34 and the plastic sheet 40 respectively are coated with a pressure sensitive adhesive by which adhesive the cut-outs 34 and the plastic sheet 40 are secured to the transparent plastic sheet 38. The junctions between the edges 42 of the cut-outs 34 and the edges 44 of the plastic sheet 40 around the cut-outs 34 are die cut so that the cut-out pictures 34 can be removed from the plastic sheet 40.

The book 30 of the present invention is used in the same manner as the book 10 of Figure 1 as previously described in that the cut-out pictures 34 can be removed from the page 32 and placed in the spaces 18 on the pages 14. When the cut-out pictures 34 are removed from the page 32, the cut-out pictures 34 will retain the pressure sensitive adhesive coating on the back surfaces of the edges 42 so that the cut-out pictures 34 will adhere to the pages 14. The paper backing sheet 36 of the page 32 can be printed with pictures corresponding to the cut-out pictures 34 so that when the cut-out pictures 34 are removed from the page 32 the pictures printed on the paper backing sheet 36 will be visible through the openings in the plastic sheet 40 and the transparent plastic sheet 38.

The present invention may be embodied in other specific forms without departing from the spirit or essential attributes thereof and, accordingly, reference should be made to the appended claims, rather than to the foregoing specification as indicating the scope of the invention.

We claim:
1. A book comprising a plurality of bound pages, some of said pages containing printed matter and blank spaces adjacent said printed matter, and at least one of said pages having cut-out pictures thereon, said cut-out pictures having a pressure sensitive adhesive on the back surface thereof by which the cut-out pictures are removably adhered to said one page and can be removably adhered to the blank spaces on the other pages, the page having the cut-out pictures comprising a paper backing sheet, a transparent plastic sheet secured across the paper backing sheet, and a top sheet secured across the transparent plastic sheet, said top sheet being cut to provide the cut-out pictures.

2. A book in accordance with claim 1 in which the paper backing sheet is printed with pictures corresponding with the cut-out pictures, which printed pictures on the paper backing sheet are visible when the cut-out pictures are removed from the top sheet.

3. A book in accordance with claim 1 in which the top sheet is made of cardboard.

4. A book in accordance with claim 1 in which the top sheet is three-dimensional to provide three-dimensional cut-out pictures, the edges of the cut-out pictures having flat back surfaces which are coated with the pressure sensitive adhesive, and the edges of the openings in the top sheet around the cut-out pictures having flat back surface which are secured to the transparent plastic sheet.

5. A book in accordance with claim 4 in which the top sheet is made of a plastic.

References Cited in the file of this patent

UNITED STATES PATENTS

| 416,171 | Mahoney | Dec. 3, 1889 |
| 720,876 | Atherton | Feb. 17, 1903 |
| 1,552,125 | Douglas | Sept. 1, 1925 |
| 2,586,039 | Heggedal | Feb. 19, 1952 |
| 2,862,309 | Von Der Hellen | Dec. 2, 1958 |

FOREIGN PATENTS

| 923,583 | France | Feb. 24, 1947 |
| 502,195 | Great Britain | Mar. 14, 1939 |